US005406594A

United States Patent [19]
Frattolillo et al.

[11] Patent Number: 5,406,594
[45] Date of Patent: Apr. 11, 1995

[54] HIGH RATE, SINGLE OR MULTI-BARREL MINIATURIZED INJECTION SYSTEM OF CRYOGENIC PELLETS, IN PARTICULAR FOR USE IN MACHINES FOR THE CONTROLLED NUCLEAR FUSION BY MAGNETIC CONFINEMENT OF PLASMA

[75] Inventors: Antonio Frattolillo; Silvio Migliori, both of Rome; Francesco Scaramuzzi, Grottaferrata; Pietro Cardoni, Rome; Lorenzo Martinis, Rome; Luciano Mori, Rome; Adolfo Reggiori; Giambattista Daminelli, both of Milan, all of Italy

[73] Assignee: Ente Per Le Nuove Technologie, L'Energia E L'Ambiente (ENEA), Rome, Italy

[21] Appl. No.: 731,062

[22] Filed: Jul. 17, 1991

[30] Foreign Application Priority Data

Jul. 17, 1990 [IT] Italy .................... 48151/90

[51] Int. Cl.⁶ .............................................. G21B 1/00
[52] U.S. Cl. ...................................... 376/100; 376/101
[58] Field of Search .................................. 376/100, 101

[56] References Cited

U.S. PATENT DOCUMENTS

| | | | |
|---|---|---|---|
| 3,626,046 | 12/1971 | Krause et al. | 264/28 |
| 3,723,246 | 3/1973 | Lubin | 376/101 |
| 4,904,441 | 2/1990 | Sorensen et al. | 376/101 |

OTHER PUBLICATIONS

Journal of Vacuum Science and Technology: Part A. vol. 6, No. 4, Jul. 1988, New York US, pp. 2556-2558; Reggiori et al: "High-speed pellet injection with a two-stage pneumatic gun" *Entire Document*.
Journal of Vacuum Science and Technology: Part A. vol. 7, No. 31, May, 1989, New York US, pp. 959-962; Reggiori et al; "Solid deuterium pellet injection with a two-stage pneumatic gun" *Entire Document*.
Journal of Vacuum Science and Technology: Part A. vol. 7, No. 31, May 1989, New York US, pp. 963-967; Combs et al: "Development of a two-stage light gas gun to accelerate hydrogen pellets to high speeds for plasma fueling applications" *Entire Document*.
Journal of Vacuum Science and Technology: Part A., vol. 7, No. 31, May 1989, New York US, pp. 925-937; S. L. Milora: "Review of hydrogen pellet injection technology for plasms fueling applications" *p. 931, right column, 2, p. 932, right column, 1* (FIGS. 8-9).
Review of Scientific Instruments, vol. 60, No. 4, Apr. 1989, New York US, pp. 570-575; Gouge, et al: "Design considerations for single-stage and two-stage pneumatic pellet injectors" *FIG. 7*
Proceedings of the 9th Symposium on Engineering Problems of Fusion Research, vol. 2, 26 Oct. 1981, Chicago, pp. 1721-1724; Lunsford et al.: "Pneumatic hydrogen pellet injector development at Oak-Ridge national laboratory" *p. 1723, left column 3, p. 1724, right column, 2.*
Proceedings of the 7th Symposium on Engineering Problems of Fusion Research, 25 Oct. 1977, Knoxville, pp. 1793-1796; S. W. Schwenterly: "Development of vacuum components for neutral beam injection applications".

Primary Examiner—Donald P. Walsh
Assistant Examiner—Frederick A. Voss
Attorney, Agent, or Firm—Stevens, Davis, Miller & Mosher

[57] ABSTRACT

The described injection system includes: a pneumatic system operating with hydrogen or helium and formed of one or more two-stage or multi-stage propulsion systems provided with special control or cutoff valves, the relative feeding circuits, and one or more decompression chambers, a cryogenic device formed of a Dewar flask containing liquid helium, a circuit for transferring and recovering the cooling fluid, and one or more conventional (in situ) or alternative cryostats provided each with one or more launching barrels in which the cryogenic pellets are solidified; a vacuum system comprising electrovalves, electropneumatic valves, rotating and turbomolecular pumps, and an equipment set for the automatic remote control of the whole system and for collecting and supplying diagnostic data to the central processing unit.

20 Claims, 7 Drawing Sheets

HIGH RATE, SINGLE OR MULTI-BARREL MINIATURIZED INJECTION SYSTEM OF CRYOGENIC PELLETS, IN PARTICULAR FOR USE IN MACHINES FOR THE CONTROLLED NUCLEAR FUSION BY MAGNETIC CONFINEMENT OF PLASMA

The present invention relates to an injection system of cryogenic pellets formed of solid slate hydrogen isotopes in a temperature range between about 4 and 19K to be supplied to machines for the magnetic confinement of plasma (for example F.T.U.). As it is known, plasma of the above machines should be supplied during the discharge for maintaining a predetermined density. The inlet, of hydrogen isotopes into the gas phase was proved to be ineffective due to the fast ionization of the gas preventing the plasma from being penetrated.

A solution of this problem is the injection of the above machines with a solid state reactant at such a rate as to assure the deposition of the fusionable material at the deepest, layers of the plasma column. Such method further allows the material removed from the pellets to be deposited more or less deeply and then the density profile of plasma to be shaped as the dimensions and the rate of the pellets change.

A general improvement of the confinement parameters has been noticed in plasma having a marked density at the centre so that injection rates higher than 2 km/s are being requested for such machines today, and even higher rates (5-10 km/s) shall be reached in the future, an impossible performance for the injection systems used today.

Such systems can be divided into two classes:
centrifugal injection systems;
pneumatic single-stage injection systems.

Centrifugal injection systems are characterized by a high injection frequency (number of pellets per second double as high as the rotation frequency of the system), however, by a low rate ($\leq 800$ m/s) and a poor shot. These features are cause of drawbacks as the low rate does not allow the plasma column to be deeply penetrated, and the poor shot causes a large proportion of pellets not to pass through the entrance window of the plasma.

Pneumatic injection systems, to which the system of the present invention belongs, are on the contrary characterized by a better shot and a higher rate (1600 m/s for single pellets, 1200 m/s for multiple injections up to a maximum of 6 pellets per second in two seconds).

With the injection systems of the status of art based upon single stage propulsion systems the above rates are the highest limit which can be reached due to the inherent ineffectiveness of the propulsion systems essentially depending upon the following reasons:

1) the pressure at the base of the pellet falls off very quickly by dynamic effect so that a high acceleration cannot be maintained for the requested time;
2) the maximum acceleration is limited by the mechanical characteristics of the pellet (about $10^7$ m/s$^2$);
3) difficulty of providing a sufficient propelling gas stock at high temperature (500°-600° C.).

In case of conventional systems the sonic or infrasonic launching rate causes very cumbersome decompression chambers to be used (about 800/1000 l).

The present invention seeks to avoid the drawbacks and the limits of the present systems and to provide a system for producing, accelerating and letting into magnetic confinement machines one or more cryogenic pellets at higher rates than those reached nowaday with the pneumatic single-stage propulsion systems.

This has been provided according to the invention by using one or more two-stage or multi-stage propulsion systems provided with a pair of special valves, better described afterwards, one of which is a control valve, the other a cutoff valve.

The use of pneumatic two-stage or multi-stage propulsion systems allows the injection rate to be increased up to about, 3 km/s (with non-protected pellets) because:

1) the dynamic pressure drop at the base of the pellet is partially compensated by the leading edge of the pressure pulse generated at the input of the barrel;
2) the pulsing pressure allows much more higher peak values (about 1200 bars) to be reached without damaging the pellet;
3) the adiabatic compression allows the gas temperature to be increased up to several thousands of degrees for a time of about 100 microseconds, which also permits the sound propagation rate in the propelling gas and then the maximum rate of the pellet to be increased.

It should be pointed out, that the above mentioned upper limit rate is determined in the present invention by the fragility of the pellet which cannot stand accelerations beyond the limit; which is imposed by the mechanical properties of the solid and not by the limits originating from the propulsion system itself having on the contrary a higher capacity than that requested for such application.

The above mentioned quick control valve of the propulsion system is operatively different from those used nowadays. Actually the quick control valves used in similar systems are essentially electropneumatic valves in which the pressure-containing member is opened by a coil and closed by the differential pressure so as to reduce the flow of the propelling gas following the pellet. In the present case, both the opening and the closure of the pressure-containing member are based upon the principle of the differential pressure and then are executed very rapidly so as to improve the efficiency of the propulsion system and to limit the flow of the propelling gas.

The above mentioned cutoff valve seeks to separate the propulsion system from the launching barrel during the condensation of the pellet, and to contribute to the limitations of the flow of the propelling gas following the pellet.

Its characteristic is of assuring a good vacuum sealing with a considerably reduced dead volume and with an orifice having a diameter corresponding to the inner diameter of the launching barrel.

In order to couple the injection system to an user a system is provided for removing and evacuating the propelling gases, said system being formed of one or more decompression chambers which may have considerably reduced dimensions (about 100/200 l) with respect to those used up to now because of the supersonic rate of the pellets.

According to another advantageous feature the cryogenic device of said system has been miniaturized in order to reduce to the minimum the consumption of liquid helium, and has been provided with a particular pipe for transferring the cooling fluid (cold vapours of helium), thus allowing a better operation and preventing thermal oscillations during the cooling.

According to a preferred embodiment the injection system according to the invention includes:

a pneumatic system operating with hydrogen and/or helium and formed of one or more two-stage or multi-stage propulsion systems, the relative inlet circuits, and one or more decompression chambers;

a cryogenic device formed of a Dewar flask containing liquid helium, a circuit for transferring and recovering the cooling fluid, and one or more conventional (in situ) or alternative cryostats like that described afterwards provided each with one or more launching barrels, in which the cryogenic pellets are solidified;

a vacuum system including electrovalves, electropneumatic valves, rotating and turbomolecular pumps; and a set of equipment for the automatic remote control of the whole system and for collecting and supplying diagnostic data to the central processing unit.

Further features and advantages of the invention will be more readily apparent from the following description with reference to the accompanying drawings showing only by way of a non-limitative example a preferred embodiment. In the drawings.

Figure 1:
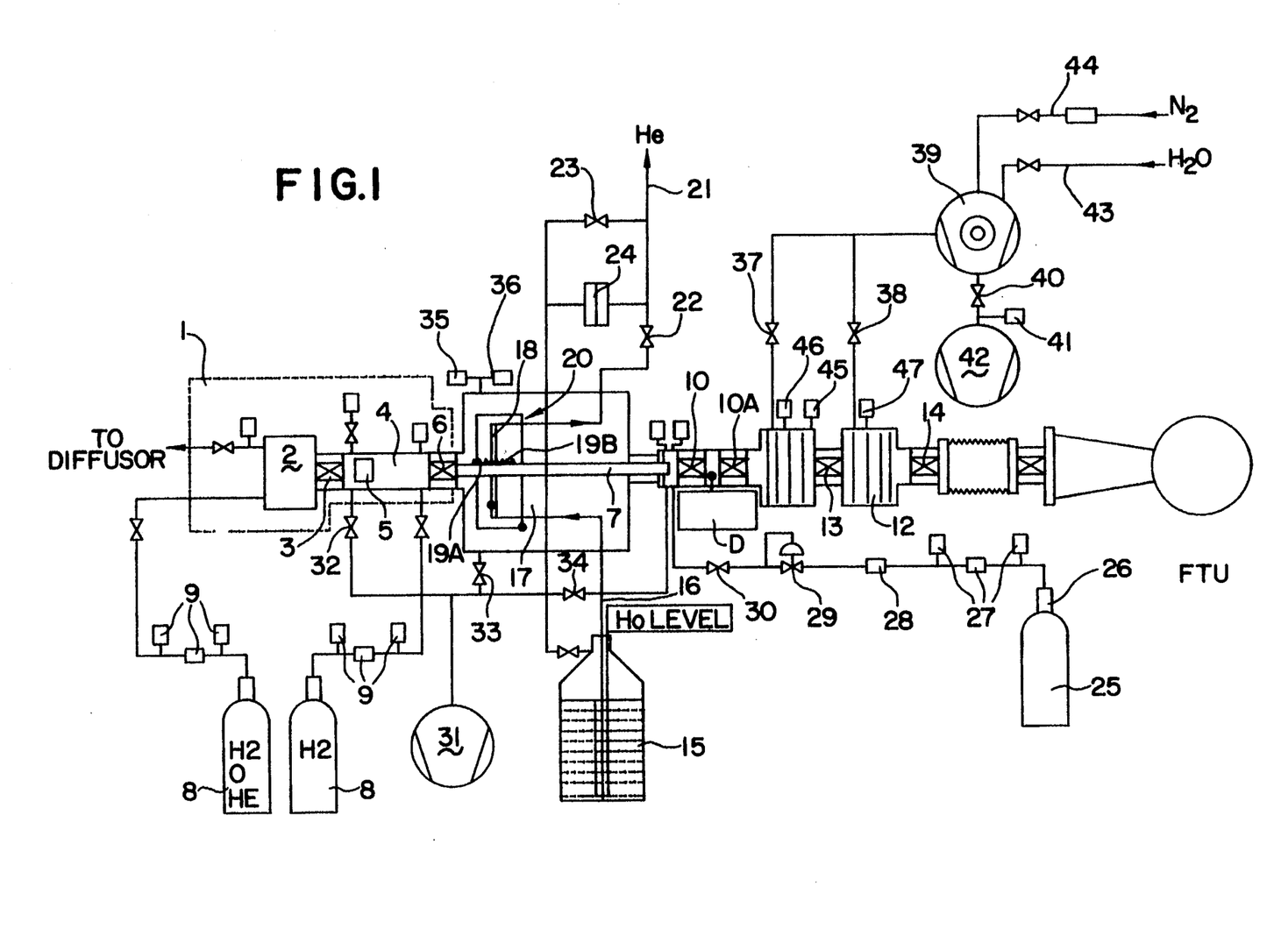
FIG. 1 is a general diagram of the device.

With reference to FIG. 1 the injection system of the present invention is formed of a supporting construction, not shown in the figure, to which a pneumatic propulsion system, a cryogenic device and a vacuum system are connected.

The pneumatic system includes a pneumatic propulsion system 1 formed of a first; stage 2, a second stage 4 and two valves 3 and 6 which will be described in more detail afterwards. The first valve 3 separates stage from stage 4, the other valve 6 separates the propulsion system 1 from the launching barrel 7. Within the second stage 4 the compression piston 5 (or more pistons) is placed. The feeding of said propulsion system 1 is provided by gas cylinders 8 through a set of valves and pressure reducers 9.

The gases ejected by the propulsion system 1 flow through launching barrel 7 of cryogenic device, valve 10, diagnostic station D, and valve 10A into decompression chambers 11 and 12, from which the gases are evacuated through a vacuum system. The decompression chambers are separated from each other by valve 13, and a valve 14 separates chamber 12 from the machine using the pellet.

The cryogenic device is formed of a Dewar flask 15 from which the fluid for refrigerating one or more copper flanges 18 is sucked through a special transferring pipe 16 which will be described afterwards. The flanges are placed within cryostat 17 and are welded to the launching barrel 7 so as to generate a cold point along the barrel at which the pellet will solidify. At the sides of flange 18 two electric resistances 19A and 19B limiting the cold zone are connected to barrel 7 in thermal contact therewith. The whole assembly is protected by a radiation screen 20 which is also cooled by the fluid conveyed then to a recovery line 21 provided with valves 22 and 23 and a differential pressure gage 24. The gas (isotopes of hydrogen) necessary to the construction of the pellet is supplied by a gas cylinder 25 through line 26 provided with a pressure reducing valve 27, a flowmeter 28, a pressure switch 29 and a valve 30. The gas is then sucked to the cold point by cryopumping.

The vacuum system includes a rotating pump 31 which evacuates second stage 4, cryostat 17 and launching barrel 7 through valves 32, 33 and 34, respectively, the vacuum measurement being effected in the above cryostat by means of two vacuum gages 35 and 36.

Decompression chambers 11 and 12 are evacuated through valves 37 and 38 by turbomolecular pump 39, valve 40 and rotating pump 42. Downstream of valve 40 the vacuum gage 41 is provided.

The turbomolecular pump is provided with a water cooling circuit; 43 and a gas nitrogen circuit 44 used in the stopping phase of the turbine. The vacuum is monitored by means of a pressure transducer 45 and two vacuum gages 46 and 47.

Figure 4:
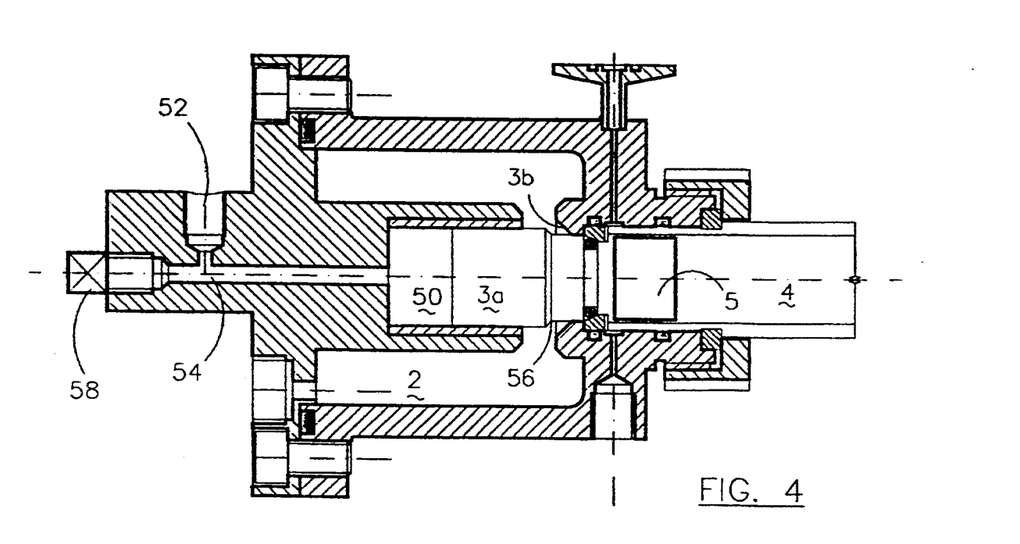
FIG. 4 shows a longitudinal section of the valve separating the first stage from the second stage of the pneumatic propulsion system.

FIG. 4 shows a preferred embodiment of valve 3. It includes a pressure-containing member or shutter 3a and a valve seat 3b separating first stage 2 from second stage 4. The shutter is pneumatically driven by high pressure gas through an inlet port, 52 and a conduit 54 upstream of chamber 50. The gas flows along the walls of the shutter and fills first stage 2.

As shown shutter 3a is cylindrical and provided with a little shoulder 56 to start the stroke when the upstream chamber 50 is evacuated to the atmosphere through electrovalve 58 at one end of conduit 54. As shutter 3a is separated from valve seat 3b the high pressure in stage 2 acts on the section of the shutter and causes the latter to move very quickly backwards.

When electrovalve 58 is closed the gas supplied from inlet 52 pushes quickly shutter 3a forwards, thus closing valve seat 3b, and then is drawn down to fill stage 2 again.

Figure 5A:
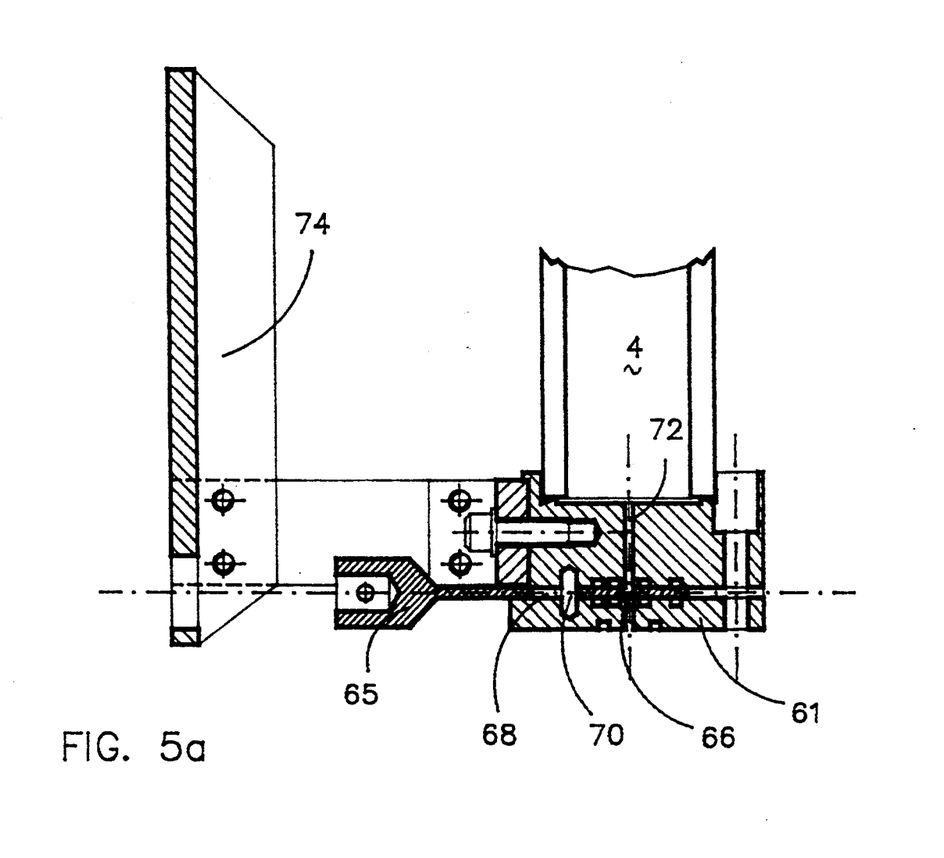
FIGS. 5a and 5b show a longitudinal section and a top plan view of the valve separating the pneumatic propulsion system of the launching barrel, respectively.
Figure 5B:
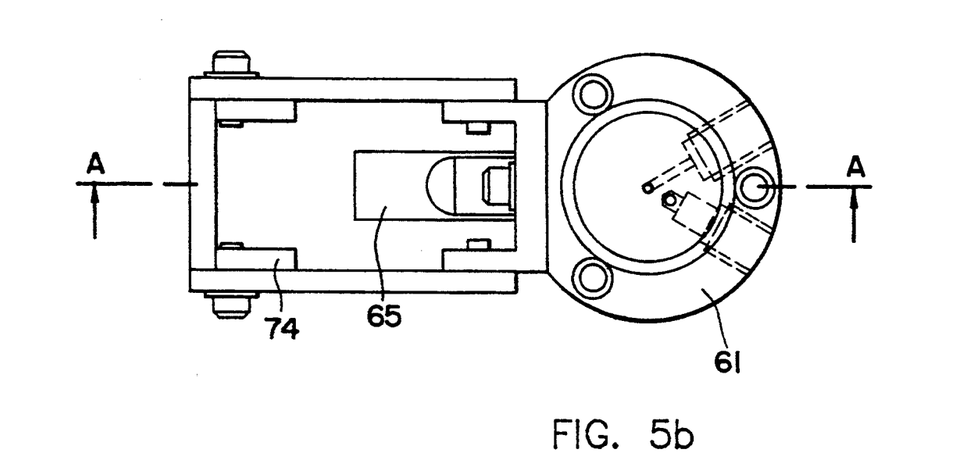

FIGS. 5a and 5b show a preferred embodiment of valve 6.

The main feature of such valve is of assuring the separation between cryostat and propulsor with a good vacuum sealing, which is essential when cold components are processed with a very small volume in order to keep a good compression ratio and then a good performance of the propulsor.

Such valve includes a body 61 in which the sliding seat of a slide 65 is formed, the latter being a blade provided with a small hole 66 and a slot 68 receiving a pin 70. The slot restricts the stroke of the slide which opens or closes the cross channel 72 connecting second stage 4 to launching barrel 7. The movement of the slide is controlled by a pneumatic actuator, not shown, which is rigidly connected to bracket 74.

Figure 6:
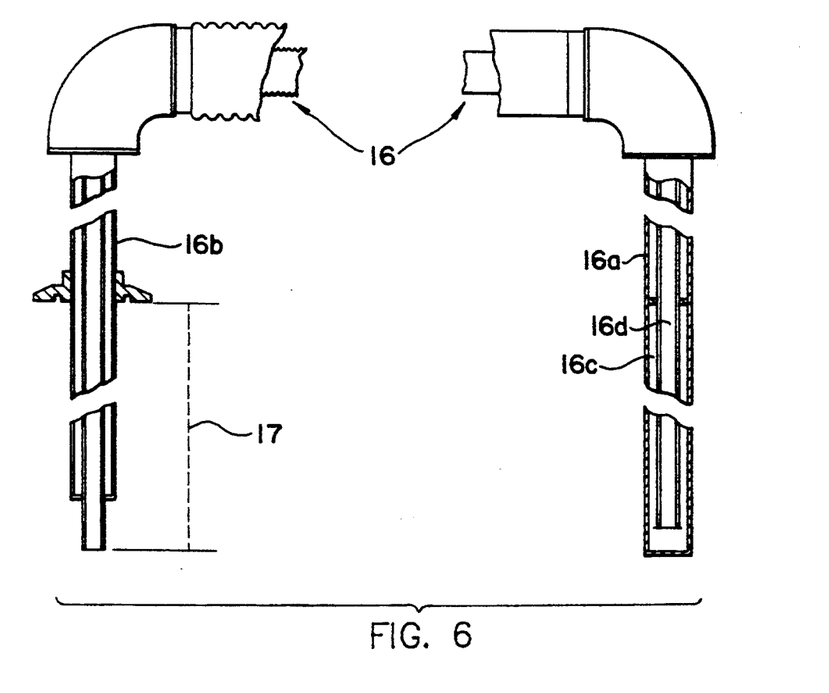
FIG. 6 is a detail of the transferring pipe of the cryogenic device.

FIG. 6 shows a preferred embodiment of the transferring pipe 16.

Pipe 16 allows the saturated vapours of tie to be drawn at a temperature of about 42K disregarding the amount of liquid contained in Dewar flask 15. It includes two branch pipes 16a and 16b which are inserted into Dewar flask 15 and cryostat 17, respectively. The pipe is insulated by a vacuum sheath, and its end which is intended for the suction of the cold gas from the Dewar flask is provided with four holes formed at an upper level than the height which can be reached by the liquid in the Dewar flask. Thus the pipe may draw only the vapour which is cooled through the sheath 16c and flows in the inner coaxial pipe 16d to reach cryostat 17.

The circulation of only the vapours avoids the drawback of the thermal oscillations produced in case of a cycling liquid.

Figure 7:
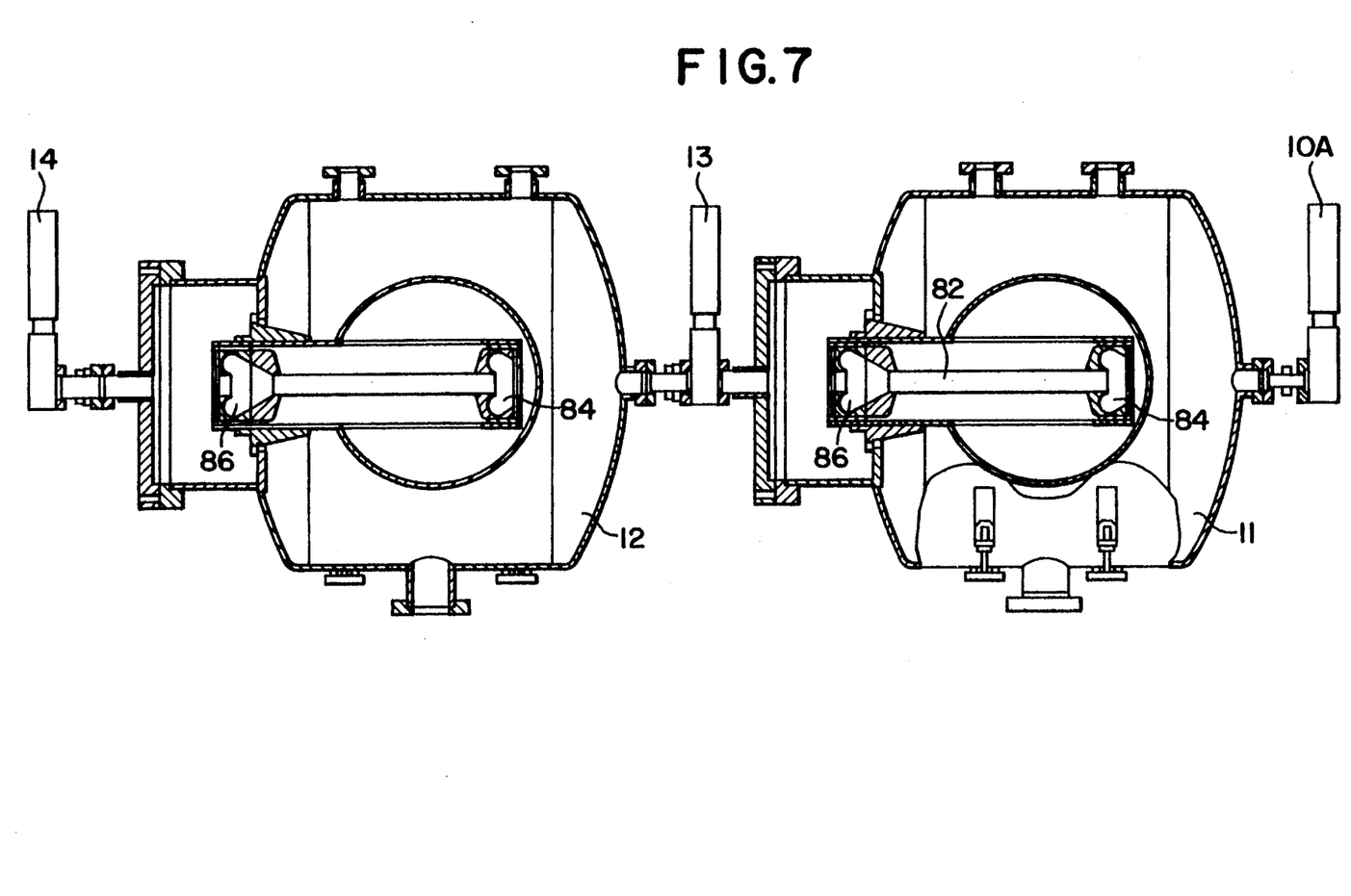
FIG. 7 shows a section of a couple of decompression chambers.
Figure 8:
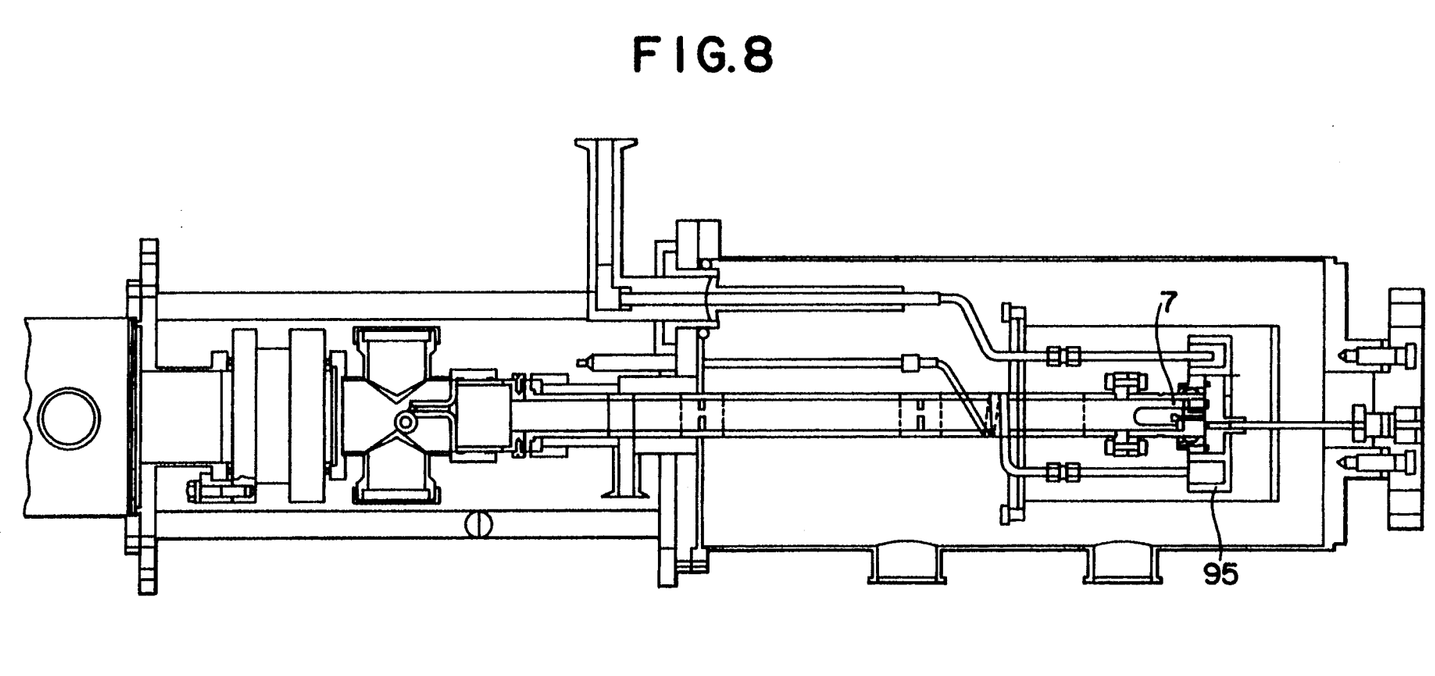
FIG. 8 is a longitudinal section view of an alternative embodiment of the cryostat.

FIG. 7 shows a preferred embodiment of the expansion or decompression chambers 11 and 12. These chambers are formed of two identic tanks connected in series with the interposition of valve 13.

As shown, the gases are conveyed in each tank through a pipe 82 the diameter of which is essentially lower than the width of the tank but considerably larger than the diameter of the pellet. Pipe 82 extends axially and is provided with dynamic impedances formed by suitable shaping of inlet ports 84 and output nozzles 86.

Because of the supersonic rate of the pellets said chambers provide a good separation of the propelling gas even with reduced overall dimensions with respect to the systems of the status of art and without guide pipes which cannot be used for very rapid pellets.

The decompression chamber system seeks to combine three criteria to separate the propelling gas from the pellet:

1) expanding the gas in a volume (100+100 liters) which is evacuated to bring down the pressure;
2) retarding the gas in crossing pipes and impedances;
3) cutting off the system by closing quick valves which are actuated after the pellet is passed in order to entrap the gas upstream thereof.

The quick closure of valve 3 and the relatively quick closure of valve 6 contribute to the reduction of the gas flow.

Figure 2A:
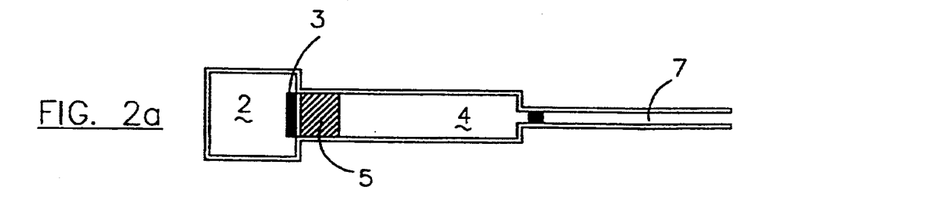
FIGS. 2a and 2b show schematically the pneumatic two-stage propulsion system with single and double piston, respectively.
Figure 2B:
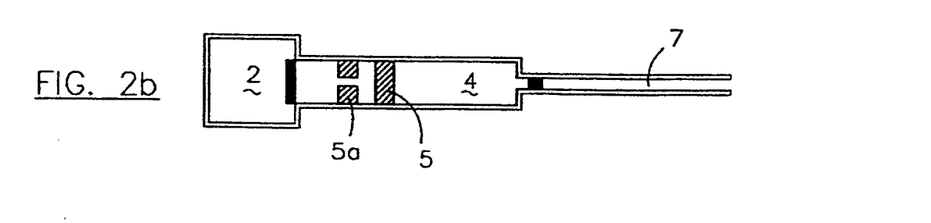

A propulsion system provided with two pistons is schematically shown in FIG. 2b. In this case the main compression piston 5 is placed downstream of a secondary piston 5a provided with a suitable hole.

Figure 3:
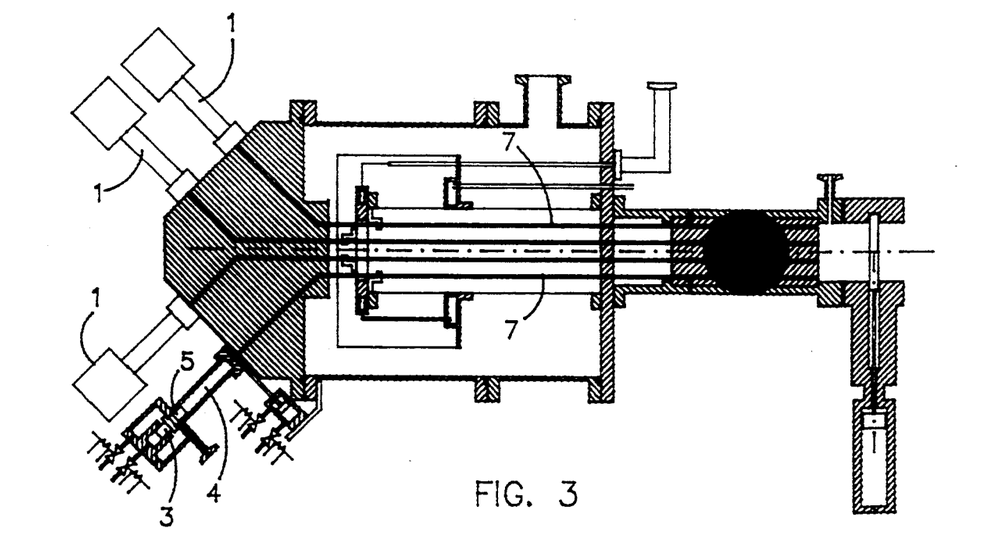
FIG. 3 shows schematically a multi-barrel variant of the injection system.

An injector provided with several barrels is shown in FIG. 3 where there are four pneumatic propulsors 1 and four launching barrels 7.

The completely automized operation of the system according to the invention is controlled by a programmable logic controller PLC, in which the operative sequence for the case of gaseous deuterium is stored, as follows.

After the whole system is supplied with power, second stage 4 of propulsion system 1, cryostat 17 and launching barrel 7 are evacuated by rotating pump 31.

A preliminary vacuum is established in decompression chambers 11 and 12 through rotating pump 42 and afterwards a lard vacuum is provided by turbomolecular pump 39. After the limit vacuum in cryostat 17 is reached, the cooling circuit of the cryogenic system is activated. As the temperature of cryostat 17 is reduced below 100K, valve 33 is closed so that cryostat 17 remains under static vacuum conditions. The subsequent cooling causes the vacuum grade to improve by cryopumping.

When the temperature of the system reaches a value lower than 20K, gaseous deuterium from gas cylinders 25 is allowed to flow into launching barrels 7.

The flow of the gaseous deuterium is monitored, regulated and integrated in the time by suitable instruments, flowmeter 28, and pressure gage 29, so as to assure a constant pressure lower than that of the triple point of the gas in the barrel during the solidification of the pellet.

When the desired amount of gas has flown through the barrel, the flow is interrupted by closing valve 30. At this time the system is subjected to a thermal regulation by the PLC and simultaneously the propulsion system 1 is loaded. High pressure gas (5 to 100 bars) is allowed to flow into first stage 2, and low pressure gas (<2 arm) is allowed to flow into second stage 4.

At this point, after the programmable logic controller has checked the processing of the system, the pellet is shot.

Soon after valves 6, 10, 10A, 13 and 14 are simultaneously opened, valve 3 causing the propulsion system 1 to shoot the pellet is also opened.

The operation is as follows:

The opening of valve 3 causes the high pressure gas contained in first, stage 2 to flow towards piston 5 which is strongly pushed forwards, thus causing the gas contained in second stage 4 to be subjected to a substantially adiabatic compression.

The produced pressure pulse accelerates the pellet along the launching barrel 7 and expels it from the latter so that it is allowed to pass through the diagnostic section D and the two decompression chambers 11 and 12 up to the centre of the plasma column.

The closure of valve 3 soon after the shooting of pellet P is followed by the closure of valves 6, 10, 10A, 13 and 14 so as to restore the starting conditions and to produce a new pellet. In particular second stage 4, launching barrel 7 and decompression chambers 11 and 12 are evacuated, and the transfer of the cooling fluid is stopped so that the cryostat is naturally heated to a temperature of about 20–25K.

Now another cycle of the system can be started again so as to produce a further shot.

In alternative to the described use of a cryostat in situ the use of a novel cryostat intended to produce pellets with better mechanical properties is provided according to the present invention.

The problem of the fragility of the solid hydrogen causing a restricted limit, to be imposed to the maximum acceleration of the cryogenic pellet and then to the injection rate thereof has been already disclosed above.

On the other hand, it is well known that the mechanical properties of a solid are strongly reduced by structural defects and imperfections in the crystal lattice; it is then reasonable to suppose that an alternative method of solidification of the pellet directed to minimize such imperfections could allow the mechanical properties of the cryogenic pellet to be improved so as to obtain better performances as far as the injection rate is concerned.

To this end the present invention suggests the use of a cryostat allowing the pellet to be solidified by a technique similar to that of the growth of the single crystals, as better illustrated afterwards.

Figure 9:
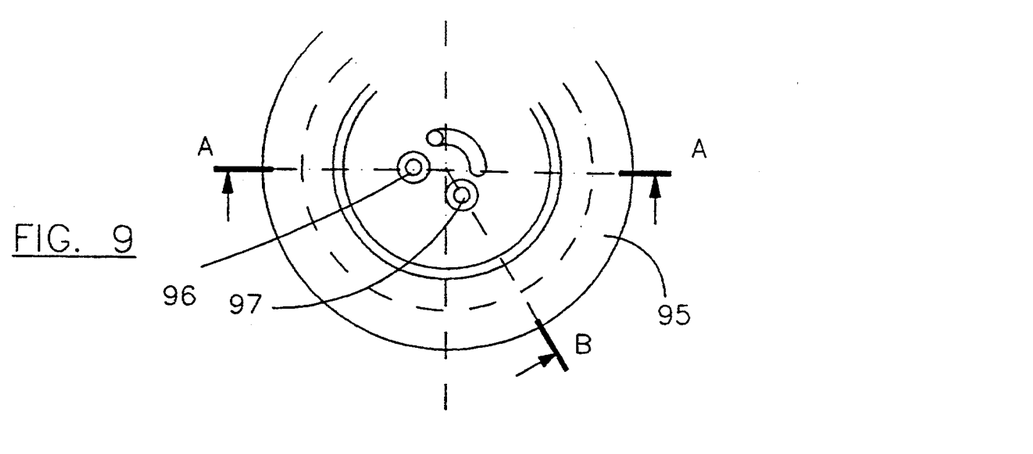
FIG. 9 is a top plan view of the cold part of the cryostat.
Figure 10A:
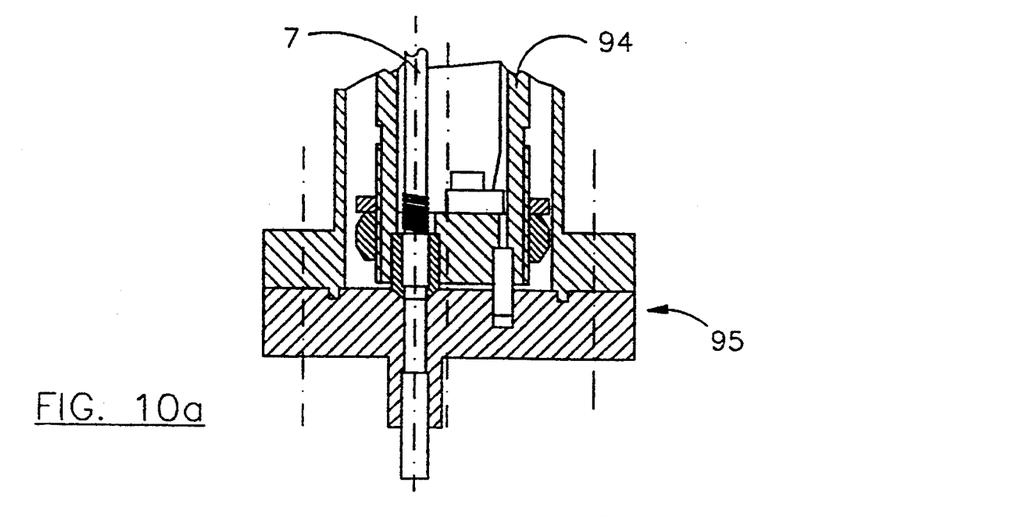
FIGS. 10a and 10b are section views along the lines A—A and A-B of FIG. 9 showing the two positions of launching and solidification of the pellets, respectively.
Figure 10B:
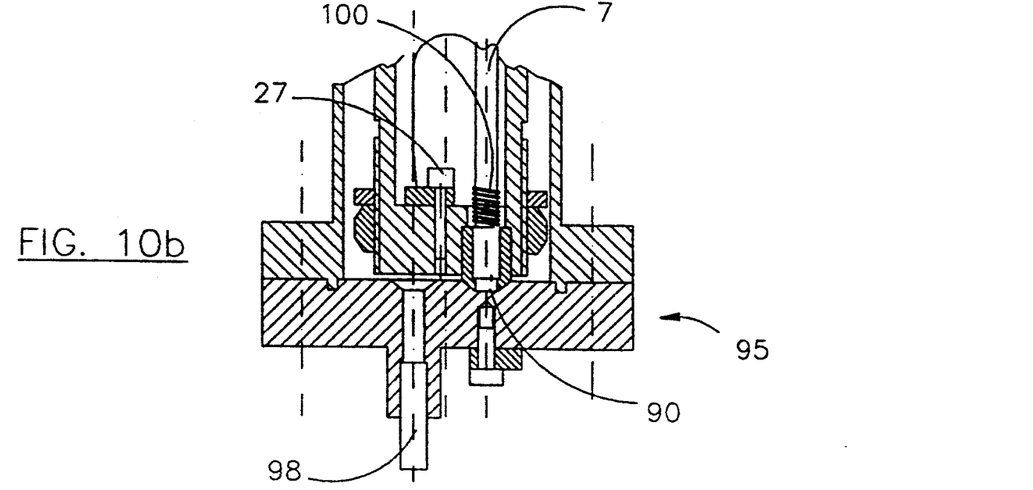

FIGS. 9, 10a and 10b show a preferred but not restricted embodiment of a device which unlike that described previously is placed vertically.

As one can see from these figures, the cryogenic pellet is not manufactured any longer directly "in situ", i.e. in the location from which it is then shot, but it is solidified in the location of FIG. 10b and then transferred to be shot to the location of FIG. 10a by a properly moved vacuum sealing system. Such system is schematically comprised of a body 94 supporting the launching barrel 7 and adapted to axially move and to rotate with respect to the fixed base 95, in which two seats are formed, a dead seat 97 and a seat; connected to the propulsor through pipe 98.

The operation is as follows: after the launching barrel 7 placed as shown in FIG. 10b is evacuated, a desired amount of reactant (for example deuterium) is supplied; the volume of the gas to be solidified is sufficiently small as to cause the pressure to be brought to a value grater than that of the triple point. When the temperature of the cryostat falls below the equilibrium value corresponding to the pressure in the barrels, the gas starts to liquefy and to be collected by gravity in chamber 90 at the lower end of barrel 7 corresponding to the cold point. The liquid starts then to solidify slowly under a thermal gradient which is suitably controlled by heater 100, for example an electric resistance, so as to simulate the typical conditions of the growth of the single crystals which is as free as possible from lattice imperfections and then provided presumably with better mechanical properties.

Once the solidification phase is completed, the pellet is carried to the location of FIG. 10a and then shot.

The present invention has been illustrated and described in some preferred embodiment but, it should be understood that operative and/or construction modifications can be made from those skilled in the art without parting from the scope of the present invention as defined in the appended claims.

We claim:

1. High rate injection system of cryogenic pellets, comprising at least a pneumatic first and second stage propulsion system, in which high pressure gas in said first stage is supplied against a piston compressing the propelling gas in said second stage through a quick control valve so as to cause in said second stage an almost adiabatic compression of the same propelling gas and to reach at an inlet port of a launching barrel of a pellet downstream of said second stage a high pressure peak up to about 2000 bars for a typical time of the order of ten to hundreds of microseconds.

2. The high rate injection system of cryogenic pellets of claim 1, wherein said second stage and said launching barrel are separated by a vacuum sealing cutoff valve having extremely reduced dead volumes and adapted to stand high pressures and temperatures.

3. The high rate injection system for cryogenic pellets of claim 1, characterized in that the propelling gases and the pellet shot by the launching barrel are fed to decompression chambers connected to a vacuum pump system in series upstream of the user's machine and are provided with dynamic impedances and turbulence chambers to delay the flow of the gases and with cutoff means to entrap the gases after the pellet is shot.

4. The high rate injection system for cryogenic pellets of claim 1, wherein the quick control valve (3) between the first (2) and the second (4) stages includes a cylindrical pressure-containing member or shutter (3a) which is pneumatically pushed into the seat, (3b) by the pressure gas supplied upstream into a chamber (50), the backward movement of said shutter being made extremely quick by a shoulder (56) on which the high pressure in the first stage (2) is acting when chamber (50) is evacuated to the atmosphere.

5. The high rate injection system for cryogenic pellets of claim 2, wherein said cutoff valve is a slide valve (6) formed of a blade (65) sliding into a seat formed in a valve body (61) and provided with a hole (66) for an opening and a closure of a channel (72) connecting said second stage (4) and said launching barrel (7), the movement of said slide valve being controlled by a pneumatic actuator.

6. The high rate injection system for cryogenic pellets of claim 3, wherein said impedances of the decompression chambers (11, 12) are formed of straight pipes (82) which extend within said decompression chambers axially with the cutoff valves, have diameters lower than the width of the decompression chambers but larger than the diameter of the pellet, and are provided at their ends with shaped ports (84) and nozzles (86) forming turbulence chambers.

7. The high rate injection system for cryogenic pellets of claim 3, wherein said decompression chambers have reduced overall dimensions and a capacity of the order of 100-200 liters.

8. The high rate injection system for cryogenic pellets of claim 1, including a drawing pipe for a refrigerating fluid (gas) adapted to draw saturated vapors at constant temperature independently of the level of liquid in a Dewar flask and without mechanical movement within said flask.

9. The high rate injection system for cryogenic pellets of claim 8, wherein said drawing pipe (16) is formed of a pair of concentric pipes, an outer pipe being closed at its end immersed into said Dewar flask, and an inner pipe (16d) within said outer pipe and communicating therewith by an innerspace (16c) between said concentric pipes at ends thereof, holes (16e) for the inlet of vapor into said interspace (16c) being formed in said outer pipe at a level which cannot be reached by the liquid in said Dewar flask.

10. The high rate injection system for cryogenic pellets of claim 1, including one or more cryostats in which the cryogenic pellet is formed by the solidification of small gas volumes in a chamber (90) corresponding to the cold point at the lower end of said launching barrel (7) which is supported by a body (94) adapted to move axially and to rotate with respect to a fixed base (95), in which two seats are formed, a dead seat (97) and a seat (96) connected to the pneumatic propulsion system, the pellet being solidified slowly under a thermal gradient suitably controlled by a heater (100) so as to simulate the typical condition of the growth of single crystals when said launching barrel (7) is located on said dead seat (97), the pellet being launched at the end of the solidification after it is carried to said seat (96).

11. The high rate injection system for cryogenic pellets of claim 1, wherein said at least one pneumatic propulsion system is a multi-stage system.

12. The high rate injection system for cryogenic pellets of claim 1, wherein said launching barrel is more than one.

13. The high rate injection system for cryogenic pellets of claim 2, characterized in that the propelling gases and the pellet shot by the launching barrel are fed to decompression chambers connected to a vacuum pump system in series upstream of the user's machine and are provided with dynamic impedances and turbulence chambers to delay the flow of the gases and with cutoff means to entrap the gases after the pellet is shot.

14. The high rate injection system for cryogenic pellets of claim 2, wherein the quick control valve (3) between the first (2) and the second (4) stages includes a cylindrical pressure-containing member or shutter (3a) which is pneumatically pushed into the seat (3b) by the pressure gas supplied upstream into a chamber (50), the backward movement of said shutter being made extremely quick by a shoulder (56) on which the high pressure in the first stage (2) is acting when chamber (50) is evacuated to the atmosphere.

15. The high rate injection system for cryogenic pellets of claim 3, wherein the quick control valve (3) between the first (2) and the second (4) stages includes a cylindrical pressure-containing member or shutter (3a) which is pneumatically pushed into the seat (3b) by the pressure gas supplied upstream into a chamber (50), the backward movement of said shutter being made extremely quick by a shoulder (56) on which the high pressure in the first stage (2) is acting when chamber (50) is evacuated to the atmosphere.

16. The high rate injection system for cryogenic pellets of claim 3, wherein said cutoff valve is a slide valve (6) formed of a blade (65) sliding into a seat formed in a valve body (61) and provided with a hole (66) for an opening and a closure of a channel (72) connecting said second stage (4) and said launching barrel (7), the movement of said slide valve being controlled by a pneumatic actuator.

17. The high rate injection system for cryogenic pellets of claim 4, wherein said cutoff valve is a slide valve (6) formed of a blade (65) sliding into a seat formed in a valve body (61) and provided with a hole (66) for an opening and a closure of a channel (72) connecting said second stage (4) and said launching barrel (7), the movement of said slide valve being controlled by a pneumatic actuator.

18. The high rate injection system for cryogenic pellets of claim 4, wherein said impedances of the decompression chambers (11, 12) are formed of straight pipe (82) which extend within said decompression chambers axially with the cutoff valves, have diameters lower than the width of the decompression chambers but larger than the diameter of the pellet, and are provided at their ends with shaped ports (84) and nozzles (86) forming turbulence chambers.

19. The high rate injection system for cryogenic pellets of claim 5, wherein said impedances of the decompression chambers (11, 12) are formed of straight pipe (82) which extend within said decompression chambers axially with the cutoff valves, have diameters lower than the width of the decompression chambers but larger than the diameter of the pellet, and are provided at their ends with shaped ports (84) and nozzles (86) forming turbulence chambers.

20. The high rate injection system for cryogenic pellets of claim 4, wherein said decompression chambers have reduced overall dimensions and a capacity of the order of 100–200 liters.

* * * * *

UNITED STATES PATENT AND TRADEMARK OFFICE
CERTIFICATE OF CORRECTION

PATENT NO. : 5,406,594
DATED : April 11, 1995
INVENTOR(S) : Antonio FRATTOLILLO, et al It is certified that error appears in the above-indentified patent and that said Letters Patent is hereby corrected as shown below:

On the title page:

ITEM [73] — The name of the Assignee should have the word "TECHNOLOGIE" amended to read -- TECNOLOGIE --.

Signed and Sealed this

Eighth Day of August, 1995

Attest:

BRUCE LEHMAN

*Attesting Officer*   *Commissioner of Patents and Trademarks*